(12) United States Patent
Munshi

(10) Patent No.: US 6,627,353 B1
(45) Date of Patent: Sep. 30, 2003

(54) DISPOSABLE LITHIUM BATTERIES

(75) Inventor: M. Zaraf A. Munshi, Missouri City, TX (US)

(73) Assignee: Lithium Power Technologies, Inc., Manvel, TX (US)

( * ) Notice: Subject to any disclaimer, the term of this patent is extended or adjusted under 35 U.S.C. 154(b) by 132 days.

(21) Appl. No.: 09/708,979

(22) Filed: Nov. 8, 2000

(51) Int. Cl.$^7$ ............................................. H01M 4/06

(52) U.S. Cl. ................................ 429/231.95; 429/218.1

(58) Field of Search ..................... 429/231.95, 218.1

(56) References Cited

U.S. PATENT DOCUMENTS

| | | | | |
|---|---|---|---|---|
| 4,626,335 A | * | 12/1986 | Cupp et al. | 204/293 |
| 5,556,721 A | * | 9/1996 | Sasaki et al. | 205/59 |
| 6,063,526 A | * | 5/2000 | Gan et al. | 429/231.9 |
| 6,174,622 B1 | * | 1/2001 | Thiebolt et al. | 429/217 |

* cited by examiner

*Primary Examiner*—Randy Gulakowski
*Assistant Examiner*—Monique Wills

(57) ABSTRACT

A safely disposable lithium battery includes a lithium anode having a capacity which is predetermined to cause complete consumption of all free lithium during battery reaction to produce electrical power in the period from initial activation until complete discharge of the battery.

27 Claims, 3 Drawing Sheets

DISPOSABLE LITHIUM BATTERIES

BACKGROUND OF THE INVENTION

The present invention relates generally to lithium batteries, and more particularly to improvements in lithium batteries which allow them to be disposed of without injury to persons or property or harm to the environment.

Ambient temperature lithium batteries represent one of the very active, relatively new fields in battery technology. Lithium has low atomic mass, has the highest amp-hour capacity of any elemental metal in the periodic table, and this, coupled with its highly reactive nature, makes it a highly interesting and desirable anodic material in batteries. Primary non-rechargeable batteries based upon lithium metal anodes have been developed during the past 30 years. A large number of systems are presently in commercial production.

During the past two decades, researchers and battery manufacturers have promoted rechargeable lithium batteries using metallic lithium as a possible solution to many consumer electronics issues in the quest for higher power devices that can be lightweight and long lasting. A lithium anode battery offers many advantages, including high energy density. For example, in a AA size cell configuration, a lithium-manganese dioxide ($Li/MnO_2$) primary or rechargeable battery has a capacity of 2 Watt-hours (Wh), compared to a nickel-cadmium (Nicad) battery which has a capacity of only 0.96 Wh in the same size cell configuration. Moreover, the lithium anode battery produces high voltage, twice that of a Nicad battery of the same configuration, and low self-discharge.

Unfortunately, however, the disadvantages of the lithium anode battery, thus far, have outweighed its advantages. These disadvantages include a need for expensive separators; a lower cycle life (in the rechargeable form) than the Nicad battery; a ruinous effect to the cell of discharging to zero volts; a relatively high cost; a long recharge time (typically, 10 hours); a safety factor that depends on cycling conditions; and a requirement of stack pressure on the lithium to undergoing cycling well. All of these problems are directly traceable to the lithium metal anode.

It is known that rechargeable lithium batteries using lithium metal anodes in contact with liquid organic electrolytes have many problems, most notably poor safety which limits battery size to smaller cells. Lithium is a very reactive element with most organic and inorganic electrolytes. The tendency for lithium to react with various solvents leads to film formation at the lithium/electrolyte interface and subsequent passivation problems.

The relatively poor cycling efficiency of the lithium anode arises because it is not thermodynamically stable in typical non-aqueous electrolytes. Cells contain typically three-to five-fold excess lithium to ensure a reasonable cycle life (number of times the battery can be recharged). Lithium plating and stripping during the charge and discharge cycles creates a porous deposit of high surface area and increased activity of the lithium metal with respect to the electrolyte. The reaction is highly exothermic and the cell can vent with flame if heated.

But these reactions can be alleviated or reduced by using alternative anodes. Many lithium alloys with lower reactivities have been proposed in the literature. Lower lithium reactivity should lead to increased safety, avoiding problems with rechargeable lithium cells attributable to the high reactivity of the lithium anode with the accompanying solvent. In any event, rechargeable lithium batteries using metallic lithium anodes in organic solvents are no longer manufactured. Instead, carbon anodes that intercalate lithium ions are the present focus of commercial rechargeable lithium ion batteries but contain no free lithium metal in the anode structure.

In addition to the aforementioned issue of safety of primary and rechargeable lithium cells, other safety issues abound such as disposability and recyclability of lithium batteries. Disposing of cells containing free lithium metal into an incinerator can lead to explosions, just as crushing these cells may also lead to fire and explosions. Furthermore, recycling of such cells requires careful handling; otherwise, the unspent lithium could lead to these same results.

The Gibb's Free Energy change for a cell reaction,

$$Li+X=LiX$$

may be calculated from thermodynamic data for many cathode couples where X represents the cathode. The cathode may be one that intercalates lithium ions, for example, vanadium oxide ($V_6O_{13}$), manganese oxide ($MnO_2$) cobalt oxide ($CoO_2$) and forms a single lithiated cathode compound with lithium ions, for example $Li_8V_6O_{13}$ or $LiMnO_2$ or $LiCoO_2$, or it can be one such as carbon monofluoride, $CF_x$, that can form a free salt with the lithium ions to form lithium chloride, LiCl and free carbon.

The battery capacity of a particular cell is usually determined by the capacity of the cathode. For example, a $V_6O_{13}$ cathode that can intercalate 8 lithium ions into its structure has a capacity of 417 milliamp-hours per gram (mAh/g) while a CFx cathode forming one mole of LiCl has a capacity of 1.033 Ah/g; typically, lithium would have a capacity of 3.86 Ah/g. Because of the high electrochemical reactivity of metallic lithium in non-aqueous electrolytes, all types of primary lithium batteries have been manufactured with limited cathode capacity and excess anode capacity, so that the maximum cell capacity can be extracted during cell discharge. The excess lithium also accounts for any parasitic reactions that could occur between the lithium metal and the liquid solvent electrolyte when the cell is on standby. Clearly, the emphasis has been on cell performance, and not particularly on safety or disposal issues.

Since approximately 1970, primary lithium batteries have been manufactured in small cells principally for photographic uses, and in more limited quantities in watches and circuit boards. Larger cells such as those based on thionyl chloride and sulfur dioxide cathodes have been used mainly in military applications such as for communications devices, and in oil drilling operations, among other applications. All of these applications have addressed problems of disposal and safety, but heretofore, practical solutions to these problems have not surfaced. Military battery usage, in particular, has encountered great difficulty in disposal protocols.

Primary lithium batteries are now being used or considered for use in a large number of consumer products, such as smart cards, greeting cards, ornaments, and other consumer applications, as well as finding increased use in applications in the military, medical field, and oil drilling, among others. In consumer applications such as greeting cards and smart cards, the assumption is that the consumer will have depleted the battery power before disposing of the battery, and in certain other consumer applications, before disposing of the device in which the battery is used. Nevertheless, free lithium usually remains in the spent battery, so that disposal of the battery can pose safety issues.

SUMMARY OF THE INVENTION

According to the present invention, a primary lithium metal anode battery is designed to have either a balanced anode and cathode capacity, or to be anode capacity limited. As a result of this design, when all of the anode material has been consumed (i.e., fully reacted with the cathode), the reaction that produced this consumption forms either a discharged lithium ion intercalated cathode product or a harmless lithium salt as a by-product, a finite cathode capacity still remains unconsumed. Typically, the discharged cathode by-product in whatever form is usually benign, non-toxic, environmentally disposable, and safe from explosions, fire and other potential hazards.

Although this design may result in a shallower discharge, no significant quantity of free lithium remains in the cell. This means that the cell can be incinerated or otherwise disposed of safely, since the final products of the cell are then solvent, separator, salt, substrate material and benign cathode product. By carefully balancing the anode and cathode capacity of the cell or making the cell anode capacity limited in accordance with the teachings of the present invention, cell capacity can be maximized or nearly so, and yet without residual free lithium upon complete discharge of the cell. In addition, designing primary lithium batteries with reduced lithium content will lead to a reduction in the materials cost of the battery as lithium is a very expensive metal.

According to another aspect of the invention, the primary lithium battery is designed to incorporate a lithium alloy such as $LiSl_x$, $LiAl_x$, $LiAl_xCr_y$, $LiAi_xMn_y$, or the like, also with either balanced anode and cathode capacity, or anode limited. The outcome of a complete discharge would be quite similar to that described above, except that the parasitic reaction between the anode and electrolyte would also be minimized during standby.

Therefore, it is a principal object of the present invention to provide a lithium battery having an internal design to assure that the battery, when spent, will have virtually no free lithium to adversely affect its safe disposal.

Another object of the invention is to employ a lithium alloy in the battery to provide a safer lithium anode regardless of whether some lithium alloy remains after complete discharge.

In the case of large primary batteries produced according to the invention, in usage in military or industrial applications the battery may be allowed to discharge completely so that all the free lithium is consumed, just as with smaller lithium cells used for consumer applications, whereby to enable either disposal or recycling of the battery in a safe manner.

In presently preferred embodiments of the invention, the lithium is laminated either on a planar metal substrate or gauze of a suitable metal such as nickel, aluminum, copper or carbon. This assures that upon complete consumption of the lithium, the integrity of the anode substrate remains intact. The tab connection to the substrate of the anode needs to be on a rigid support; otherwise a tab connecting directly to the lithium metal or its alloys may lose contact and hence integrity during discharge, resulting in loss of electrical contact and partial cell discharge and free lithium remaining in the cell.

Additionally, the capacity of the lithium is controlled in preferred embodiments by vacuum depositing the lithium anode into a thin film to reach the desired capacity.

BRIEF DESCRIPTION OF THE DRAWING

The above and still further aims, objectives, features, aspects and attendant advantages of the present invention will become apparent from the following detailed description of certain preferred embodiments and methods of fabrication of lithium batteries and cells in accordance with the invention, constituting the best mode presently contemplated of practicing the invention, when taken in conjunction with the accompanying drawings, in which.

Figure 1:
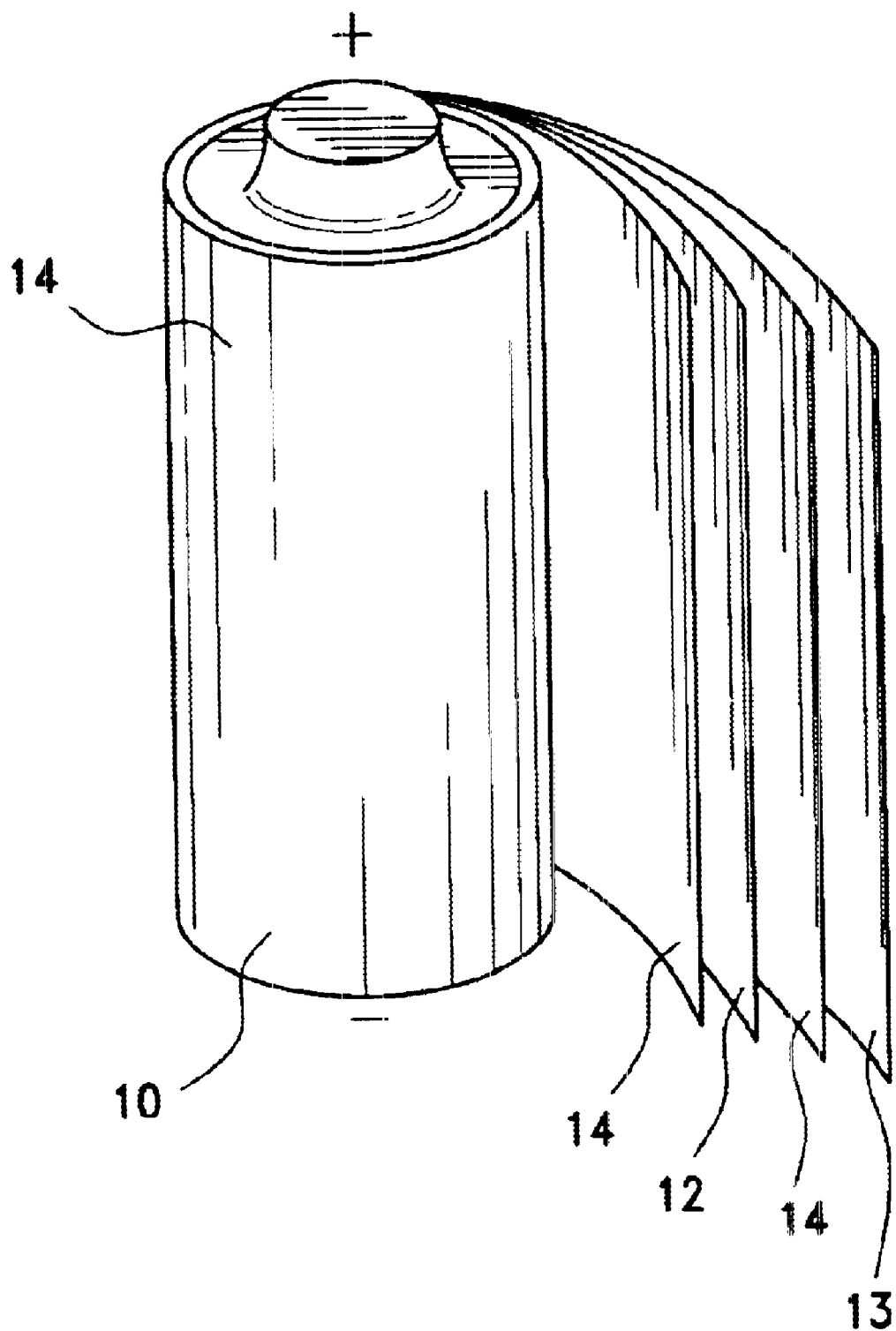
FIG. 1 is a perspective view of a cylindrically wound lithium metal primary battery, which is partially unwrapped to illustrate the components of the battery.
Figure 2:
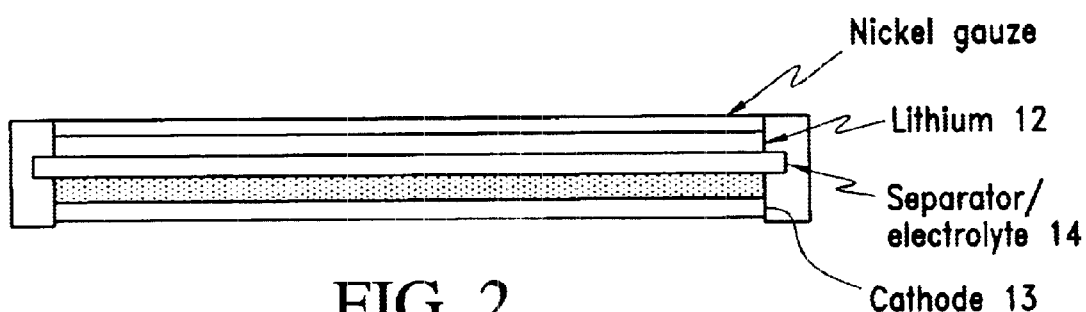
FIG. 2 is a side view of a rectangular flat battery, which is open to illustrate the components of the battery.

DETAILED DESCRIPTION OF PRESENTLY CONTEMPLATED BEST MODE OF PRACTICING THE INVENTION

Referring now to the drawings, in which common elements are designated by common reference numbers, and which are not intended to be to scale, a primary lithium battery or cell 10 includes a lithium metal anode 12, a cathode 13 composed of the active material, e.g. $CF_x$, combined with conductive carbon and binder, for example, and an electrolyte 14 such as lithium hexafluorophosphate in propylene carbonate, all of which are housed within an enclosure 15 such as a deep drawn metal can made of, for example, nickel or aluminum.

In accordance with the principles of the present invention, the lithium metal anode 12 of battery 10 is designed to have a capacity which is predetermined to cause substantially complete consumption of all free lithium during battery reaction to produce electrical power in a period from initial activation until complete discharge of the battery. This may be achieved by forming the anode 12 to the cathode 13 amp-hr capacity in the ratio of 1 in the cell 10 that results in substantially all free lithium in the anode being consumed in anodic/cathodic reaction in the presence of electrolyte 14 during complete discharge of the cell, to allow the battery to be safely disposed of or recycled. For example, if 1 gram of lithium is used in the anode construction of the cell, with a lithium amp-hr capacity of 3.86 Ah/g, then the weight of active cathode, by way of example, $CF_x$ in the composite cathode material should be 3.737 grams (based-on 1.033 Ah/g capacity of this cathode material). In that sense, the anode and cathode capacity may be regarded as being balanced. Alternatively, the invention may be characterized as contemplating a lithium cell in which the lithium anode capacity is limited.

For a typical consumer battery or device in which a lithium battery may be used, the result of this anode/cathode capacity balancing or limited anode capacity is that when all of the anode capacity has been consumed through the cell reaction that results in the formation of either a discharged lithium ion intercalated cathode product or a harmless lithium salt by-product, some cathode capacity remains unconsumed. This may result in a shallower discharge, but the fact that no free lithium remains in the cell means that the cell may be incinerated or otherwise disposed of or recycled without concern that personal injury, property damage or harm to the environment may ensue, because the by-products of the spent cell are now solvent, salt, separator, substrate materials, and benign cathode product.

And by carefully balancing the capacities of anode 12 and cathode 13, the cell 10 capacity may be maximized or optimized with assurance that no lithium residue will remain after the cell has been completely discharged.

Alternatively, or in addition to the foregoing principles of the invention, it is contemplated that a primary lithium battery 10 of the invention may incorporate a lithium alloy in the anode 12, with either a balanced anode and cathode capacity or limited anode capacity. The use of such an alloy will provide the same or substantially similar result to use of a pure lithium anode (on a substrate), but with an added advantage that the parasitic reaction between the anode 12 and the electrolyte 14 may be minimized during normal battery standby. Moreover, use of a lithium alloy in the anode will allow safe disposal of the battery even if some lithium alloy remains after complete discharge.

Large primary batteries that incorporate the design principles of the invention, for use in military or industrial applications, for example, should be completely discharged before being disposed of or recycled. This will tend to assure that the disposal or recycling is quite safe since all or substantially all of the free lithium will have been consumed. This is not possible to do in present state-of-the-art large military or commercial primary lithium batteries which are designed with excess lithium capacity rather than excess cathode capacity, and even with complete discharge, unspent free lithium remains posing serious safety, disposal and recycling risks.

Figure 3A:
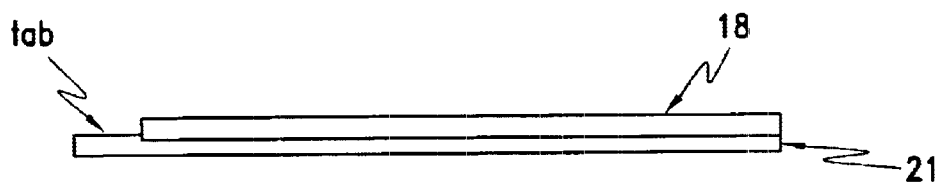
FIGS. 3a to 3d illustrate different designs of the lithium anode on various designs of substrate material.
Figure 3B:
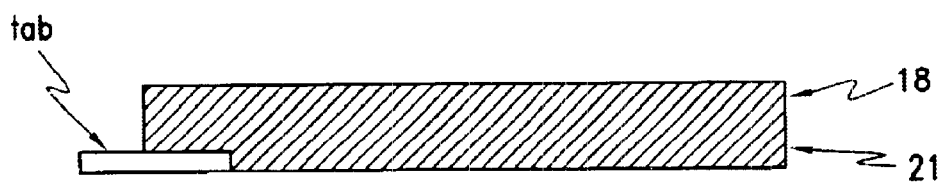

As shown most clearly in FIGS. 3a and 3b, the lithium 18 is preferably laminated either on a planar metal substrate 21 or gauze 22 of a suitable metal such as nickel, aluminum, copper or carbon. As a consequence of this processing, the integrity of the anode substrate 21 or 22 remains intact after complete consumption of the lithium.

Figure 3C:
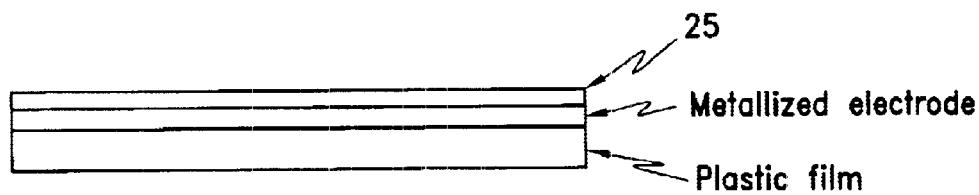
Figure 3D:
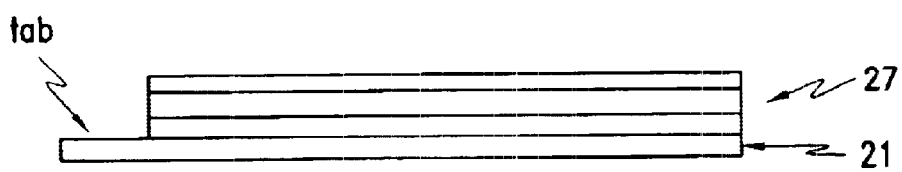

Preferably also, the capacity of the lithium anode is controlled during its formation by vacuum depositing the lithium in a thin film 25 of appropriate dimensions on a metallized plastic substrate as shown in FIG. 3c until the desired predetermined or preset capacity is achieved. The plastic can be made of thin film polyester or polypropylene, less than 25 microns thick, while the metallized layer is made of aluminum, nickel, copper, carbon and is typically 100 to 1000 Angstroms thick, and the lithium layer between 0.1 to 10 microns thick. Alternatively, the lithium anode is laminated in thin extruded sheets 27, as shown in FIG. 3d, to achieve the desired capacity. In this case, several layers of thin lithium extruded sheets are laminated on top of one another with specific amp-hr capacity per unit volume directly onto the appropriate current collector.

Figure 4:
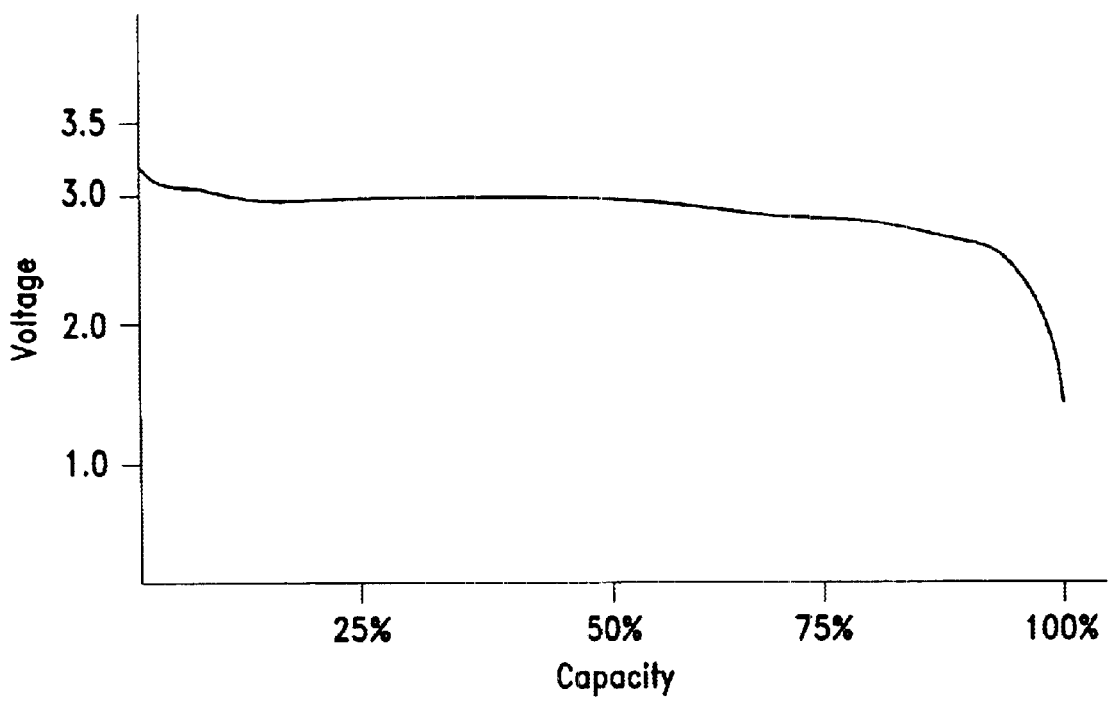
FIG. 4 is a typical discharge curve of a regular lithium primary, $Li/CF_x$, battery with limited cathode capacity and anode excess.
Figure 5:
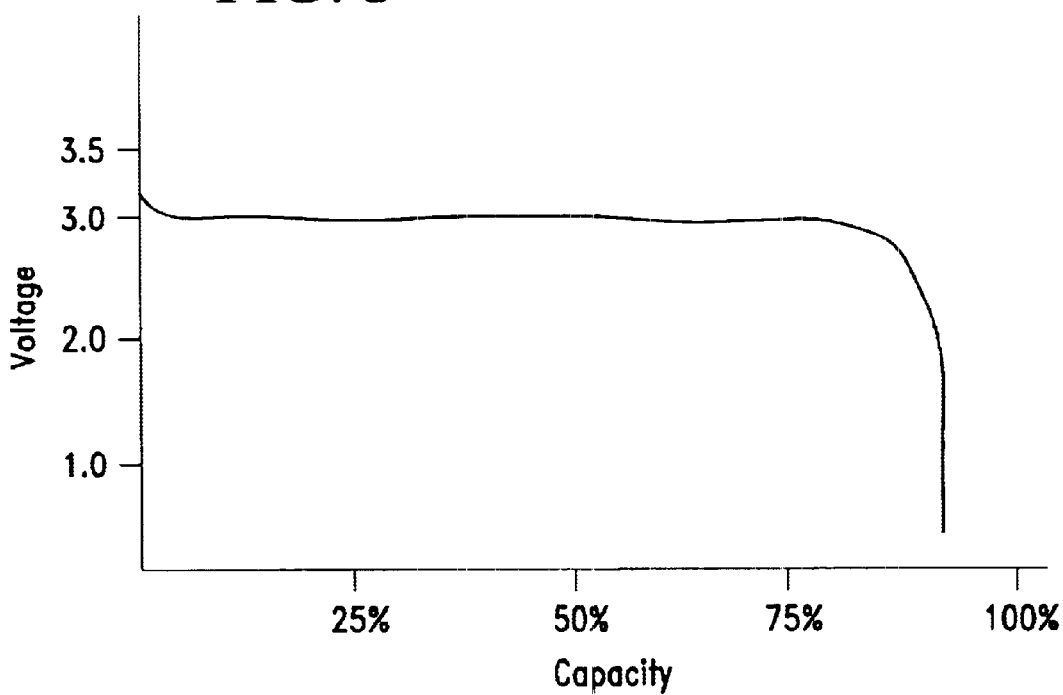
FIG. 5 is a typical discharge curve of a lithium primary, $Li/CF_x$, battery designed in this invention with limited anode capacity and cathode excess.

By virtue of the invention, an anode-starved cell will have a sharper knee upon discharge during its end-of-life than an anode-rich cell and the sharp voltage drop will occur from a point of higher voltage or shallower capacity than that theoretically available from the cathode active material. FIG. 4, which shows a typical discharge curve of a regular lithium primary, Li/CF$_x$, battery with limited cathode capacity and anode excess, and FIG. 5, which shows a typical discharge curve of a lithium primary, Li/CF$_x$, battery designed in this invention with limited anode capacity and cathode excess, illustrate this graphically. Additionally, the invention results in the production of lithium cells of reduced cost, attributable to the smaller quantity of lithium used in the cell.

Although certain exemplary embodiments and methods have been described herein to disclose the presently-contemplated best mode of practicing the invention, it will be appreciated by those skilled in the art to which the invention pertains from a consideration of the foregoing description, that variations and modifications of these embodiments and methods may be made without departing from the spirit and scope of the invention. Accordingly, it is intended that the invention shall be limited only by the appended claims and the rules and principles of applicable law.

What is claimed is:

1. A lithium cell, comprising a lithium anode, a cathode of active material selected to react with the anode, and an electrolyte, said anode and cathode being selected to have a ratio of amp-hour capacity in the cell that results in all free lithium in the anode being consumed in anodic/cathodic reaction in the presence of an electrolyte during complete discharge after activation of the cell, whereby to allow safe disposal or recycling of the cell.

2. The lithium cell of claim 1, wherein said anode and cathode have balanced capacity in the cell.

3. The lithium cell of claim 1, wherein said anode is limited to a predetermined capacity to cause said consumption of all free lithium during complete discharge of the cell.

4. The lithium cell of claim 1, wherein said anode is composed of lithium alloy.

5. The lithium cell of claim 4, wherein said lithium alloy is selected from a group comprising LiSi$_x$, LiAl$_x$, LiAl$_x$Cr$_y$, and LiAl$_x$Mn$_y$.

6. The lithium cell of claim 1, wherein said anode is composed of lithium laminated on a planar metal substrate or on a metallic gauze so that upon substantially complete consumption of free lithium, the integrity of the anode substrate remains intact.

7. The lithium cell of claim 6, wherein the metal of said planar metal substrate or said metallic gauze is selected from a group comprising nickel, aluminum, copper and carbon.

8. The lithium cell of claim 3, wherein said lithium anode is a thin film having dimensions to achieve said predetermined capacity.

9. The lithium cell of claim 3, wherein said lithium anode comprises laminated thin extruded sheets to achieve said predetermined capacity.

10. A safely disposable, primary liuhim battery comprising a lithium anode having a capacity selected for complete consumption of all free lithium during battery reaction to produce electrical power in a period from initial activation until complete discharge of the battery.

11. The safely disposable, primary lithium battery of claim 10, wherein said anode and cathode have balanced capacity in the cell.

12. The safely disposable, primary lithium battery of claim 10, wherein said anode is limited to a predetermined capacity to cause said consumption of all free lithium during complete discharge of the cell.

13. The safely disposable, primary lithium battery of claim 10, wherein said anode is composed of lithium alloy.

14. The safely disposable, primary lithium battery of claim 13, wherein said lithium alloy is selected from a group comprising LiSi$_x$, LiAl$_x$, LiAl$_x$Cr$_y$, and LiAl$_x$Mn$_y$.

15. The safely disposable, primary lithium battery of claim 10, wherein said anode is composed of lithium laminated on a planar metal substrate or on a metallic gauze so that upon substantially complete consumption of free lithium, the integrity of the anode substrate remains intact.

16. The safely disposable, primary lithium battery of claim 15, wherein the metal of said planar metal substrate or said metallic gauze is selected from a group comprising nickel, aluminum, copper and carbon.

17. The lithium cell of claim 12, wherein said lithium anode is a thin film having dimensions to achieve said predetermined capacity.

18. The lithium cell of claim 12, wherein said lithium anode comprises laminated thin extruded sheets to achieve said predetermined capacity.

19. A method of manufacturing a lithium battery, comprising the steps of forming a lithium anode and a cathode of active material selected to react with the lithium anode upon activation of the battery with said anode and said cathode in the presence of an electrolyte, housing the anode and cathode in an enclosure with the electrolyte, and presetting the capacity of the lithium in the anode for complete consumption of all free lithium by the time the battery is completely discharged, to render the battery safely disposable when discharged.

20. The method of claim 19, wherein the step of forming said anode and said cathode is performed to produce substantially balanced capacities of the two in the cell.

21. The method of claim 19, wherein the step of forming said anode comprises using a lithium alloy as the anode.

22. The method of claim 21, including selecting said lithium alloy from a group comprising $LiSi_x$, $LiAl_x$, $LiAl_xCr_y$, and $LiAl_xMn_y$.

23. The method of claim 19, wherein the step of forming said anode comprises laminating lithium on a planar metal substrate or on a metallic gauze so that upon substantially complete consumption of free lithium, the integrity of the anode substrate remains intact.

24. The method of claim 23, including selecting the metal of said planar metal substrate or said metallic gauze from a group comprising nickel, aluminum, copper and carbon.

25. The method of claim 19, wherein the step of forming said anode comprises vacuum depositing said lithium anode into a thin film dimensioned to achieve said preset capacity.

26. The method of claim 19, wherein the step of forming said anode comprises laminating said lithium anode in thin extruded sheets to achieve said preset capacity.

27. A greeting card having an integral power source to convey a greeting for perception by at least one of the senses of sight, sound, smell and touch of the card reader, said power source comprising a lithium battery adapted to be activated when said card is opened, said battery including a lithium anode with a lithium anodic capacity having a magnitude which is set for complete consumption of all free lithium in the battery by the time the battery is substantially fully discharged, to eliminate presence of free lithium that would pose a battery safety problem when the card is discarded.

* * * * *